United States Patent
Hennemann

(10) Patent No.: US 7,601,292 B2
(45) Date of Patent: Oct. 13, 2009

(54) BLOW MOLDING MACHINE

(75) Inventor: Ulrich Hennemann, Traismauer (AT)

(73) Assignee: Bekum Maschinenfabriken GmbH, Berlin (DE)

( * ) Notice: Subject to any disclaimer, the term of this patent is extended or adjusted under 35 U.S.C. 154(b) by 356 days.

(21) Appl. No.: 11/703,847

(22) Filed: Feb. 8, 2007

(65) Prior Publication Data
US 2007/0205540 A1 Sep. 6, 2007

(30) Foreign Application Priority Data
Feb. 9, 2006 (DE) .................. 10 2006 006 244

(51) Int. Cl.
*B29C 49/04* (2006.01)
*B29C 49/30* (2006.01)
*B29C 49/70* (2006.01)

(52) U.S. Cl. .............. 264/542; 425/532; 425/534; 425/537; 425/538

(58) Field of Classification Search ............... 425/522, 425/532, 534, 537, 538; 264/542
See application file for complete search history.

(56) References Cited

U.S. PATENT DOCUMENTS

| | | | | |
|---|---|---|---|---|
| 5,030,083 A | * | 7/1991 | Kohno et al. ........... | 425/532 |
| 5,288,224 A | * | 2/1994 | Yamamura et al. ...... | 425/531 |
| 5,576,034 A | * | 11/1996 | Kiefer et al. ........... | 425/532 |
| 7,300,273 B2 | * | 11/2007 | Koetke ................. | 425/532 |
| 2003/0091683 A1 | | 5/2003 | Johnson | |
| 2004/0155386 A1 | | 8/2004 | Gonda et al. | |

FOREIGN PATENT DOCUMENTS

| | | |
|---|---|---|
| EP | 1614524 A1 | 11/2006 |
| WO | WO0123164 A1 | 5/2001 |

OTHER PUBLICATIONS

European Search Report, dated Dec. 4, 2008.

* cited by examiner

*Primary Examiner*—Robert B Davis
(74) *Attorney, Agent, or Firm*—Greer, Burns & Crain, Ltd.

(57) ABSTRACT

The blow molding machine is characterized in that that the preferably two closing units can be reciprocated along a first guide path extending in a direction transverse to a second guide path which extends from a central removal position of the first guide path to the insertion device, the lower closing plates with the lower mold halves of the two closing units being alternately movable on the second guide path from the removal position to the insertion device and back. The blow molding machine is characterized by an improved mode of operation.

9 Claims, 3 Drawing Sheets

BLOW MOLDING MACHINE

The present invention relates to a blow molding machine with an extruder having an extrusion head, comprising at least one, preferably two, closing units, each having an upper closing plate with the upper mold half and a lower closing plate with the lower mold half, the upper closing plates with the upper mold halves being vertically movable and the lower closing plates with the lower mold halves being horizontally movable to an insertion device under the extrusion head, and the insertion device inserting the respective parison exiting from the extrusion head into the lower mold half positioned at said place. Moreover, the present invention relates to a method for blow molding tubular bodies of plastics which are preferably bent several times, using at least one, preferably two, closing units.

For making tubes that are bent several times and have a bend extending in more than one plane, the so-called "tube insertion method", also called "3-D method", has established itself in avoiding a large amount of waste and the accompanying drawbacks.

FIG. 1 shows essential components of a blow molding machine used for this purpose. Apart from the known extrusion part, the machine contains the extruder with the extrusion head 10, one or two closing units, and an insertion device 6.

The basic structure of the closing unit corresponds to that of a press. There is a frame 1 with an upwardly mounted and vertically acting hydraulic cylinder 5 for vertically moving an upper closing plate 3 with the upper mold half 9 along guides 4, and a lower closing plate 2 arranged to be extensible at the bottom and comprising the lower mold half 8.

The insertion device 6 is normally an industrial robot provided with tongs 7.

Prior to the beginning of a production cycle the upper closing plate 3 with the upper mold half 9 has been moved upwards, the lower closing plate 2 with the lower mold half 8 thereunder, the tongs 7 of the insertion device 6 have been opened directly underneath the nozzle of the extrusion head 10, the parison has exited out of the nozzle. The lower closing plate 2 is now completely extended out of the area of the press towards extrusion head 10. When the parison has reached the necessary length, it is separated by the tongs 7 and moved downwards to such an extent that its lower end is fixed by a receiving tool 11 of the lower closing plate 2 (pin or tongs). According to one aspect of the present invention the lower closing plate 2 is moved back again during the insertion operation and the industrial robot 6 thereby moves the upper end of the parison in conformity with the shape of the mold cavity. After completion of the insertion process the tongs 7 move again into the initial position under the extrusion head 10, and the lower plate 2 continues its travel until it is exactly positioned under the upper mold half 9. The mold 8, 9 is closed and will remain in said position until the tube has built up enough dimensional stability for the demolding process. The upper mold half 9 then moves upwards and the blow-molded part is removed. The new cycle will start from this position.

The method can for instance be used for producing filling tubes for plastic fuel tanks. In this instance the tube may be composed of up to seven layers of different plastic materials and the extrusion unit of the production machine is expensive accordingly. The use of a "dual machine" is here paying off.

In such a "dual machine", which is within the scope of the invention, two closing units may be arranged such that they are opposite each other and that the lower closing plate is moved alternately to the extrusion head and back again under the upper closing plate. This installation of the closing units entails a relatively large machine that requires a large mounting area, as can be seen in FIG. 2. The blow-molded parts are removed each time at the left and right side and must again be brought to a joint place for finishing work.

It is the object of the present invention to indicate an inexpensive blow molding machine with an improved mode of operation.

The object is achieved according to the blow molding machine and method of blow molding tubular bodies of plastics described and claimed herein.

In the blow molding machine of the invention, at least one closing unit can be reciprocated along a first guide path which extends in a direction transverse, preferably at a right angle, to a second guide path extending from the first guide path to the insertion device. Preferably, two closing units are provided, the lower closing plates of the two closing units being alternately movable along the second guide path to the insertion device and back under the associated upper closing plate.

Furthermore, it is provided that approximately in the center of the first guide path a joint removal station is arranged for the two closing units with the associated removal device and at both sides thereof a respective blowing station for an associated closing unit, wherein the devices needed for blowing are moving along on the closing unit and are mainly used in the blowing station. The preferably two closing units are preferably jointly movable such that one of the closing units can be positioned at the removal station and the other closing unit at its blowing station.

According to a first aspect the method according to the invention provides the following steps:
a) the lower closing plate with the lower mold half of a closing unit is moved in the opened state thereof from a removal position along a guide path under the extrusion head;
b) an extruded parison is inserted into the lower mold half while the lower closing plate with the lower mold half is moved back under the upper closing plate with the upper mold half to the removal position;
c) the closing unit is closed;
d) the parison in the closing unit is blown at the associated blowing station into the tubular body;
e) the closing unit is opened and the tubular body is removed.

According to another aspect of the present invention, in which two closing units are provided, the method according to the invention provides the following steps:
a) the lower closing plate with the lower mold half of a closing unit is moved in the opened state thereof from a removal position along a guide path under the extrusion head;
b) an extruded parison is inserted into the lower mold half while the lower closing plate with the lower mold half is moved back under the upper closing plate with the upper mold half to the removal position;
c) the closing unit is closed;
d) the parison in the closing unit is blown at the associated blowing station into the tubular body;
e) the closing unit is opened and the tubular body is removed;
f) while the lower closing plate with the lower mold half of the second closing unit is moved under the extrusion head and the next extruded parison is inserted into the lower mold half and the lower closing plate is moved back to the removal position, the parison in the first closing unit is blown at the first blowing station into the tubular body;

g) the second closing unit is moved to the second blowing station while the first closing unit is moved to the removal station preferably at the same time;

h) the first closing unit is opened and the tubular body is removed.

In the arrangement of two closing units, the machine according to the invention requires a particularly small mounting area. Since the closing units must be moved away to the right and left side, respectively, for the final blowing of the tubular bodies, the functions "insertion" and "removal" are always carried out at the same place, so that the devices required for this are only needed once in the machine of the invention. In contrast to the conventional method the part times of the production steps are moreover exactly the same for the two closing units. Since the parison is inserted into the lower mold half returning to the upper mold half, this production step requires little time.

Further details of the invention become apparent from the following description taken in conjunction with the drawings, of which:

Figure 3:
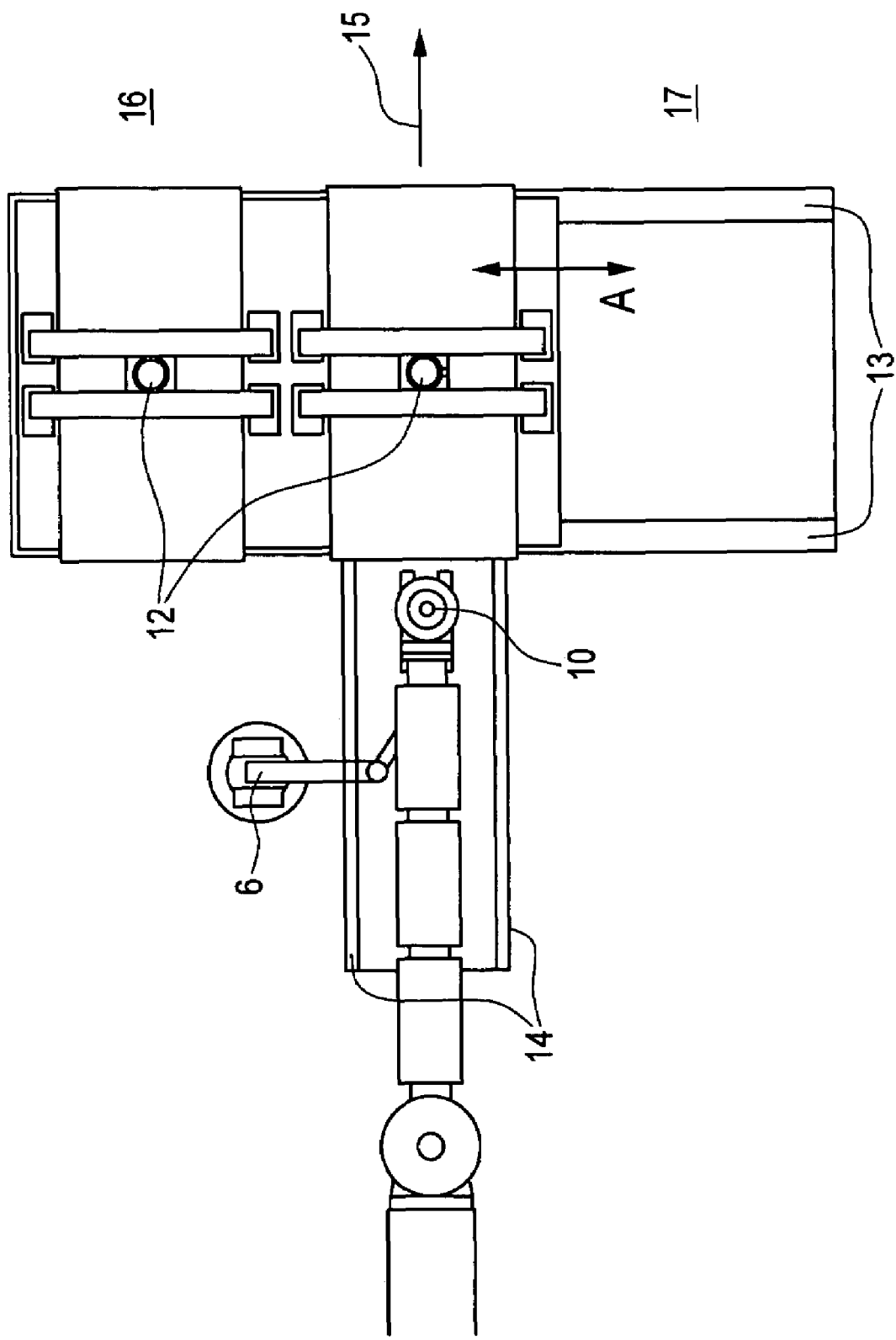
FIG. 3 is a purely schematic top view on a preferred embodiment of a blow molding machine according to the invention.

FIG. 3 shows in a purely schematic way that two closing units 12 are arranged side by side along a guide path 13 on which both closing units can be jointly reciprocated along an arrow A. Approximately in the center of the guide path 13, a second guide path 14 is arranged, which extends at a right angle relative thereto and on which the lower closing plate 2 arranged at a respective removal station 15 is movable under the insertion device 6. The longitudinal axis of the extruder 16 extends here in parallel with the guide path 14.

The guide path 14 has arranged thereon an electrically driven carriage (not shown) which is controlled by the controller of the insertion device and which is adapted to be coupled with the respective lower closing plate 2 at the removal station 15 and moves the lower closing plate 2 to the insertion station and back.

The upper closing unit in FIG. 3 is positioned at its blowing station 16. When the upper closing unit is moved to the removal station 15, the closing station that is the lower one in the illustration passes into its blowing station 17 at the end of the guide path 13, which is the lower one in the illustration of FIG. 3.

Figure 1:
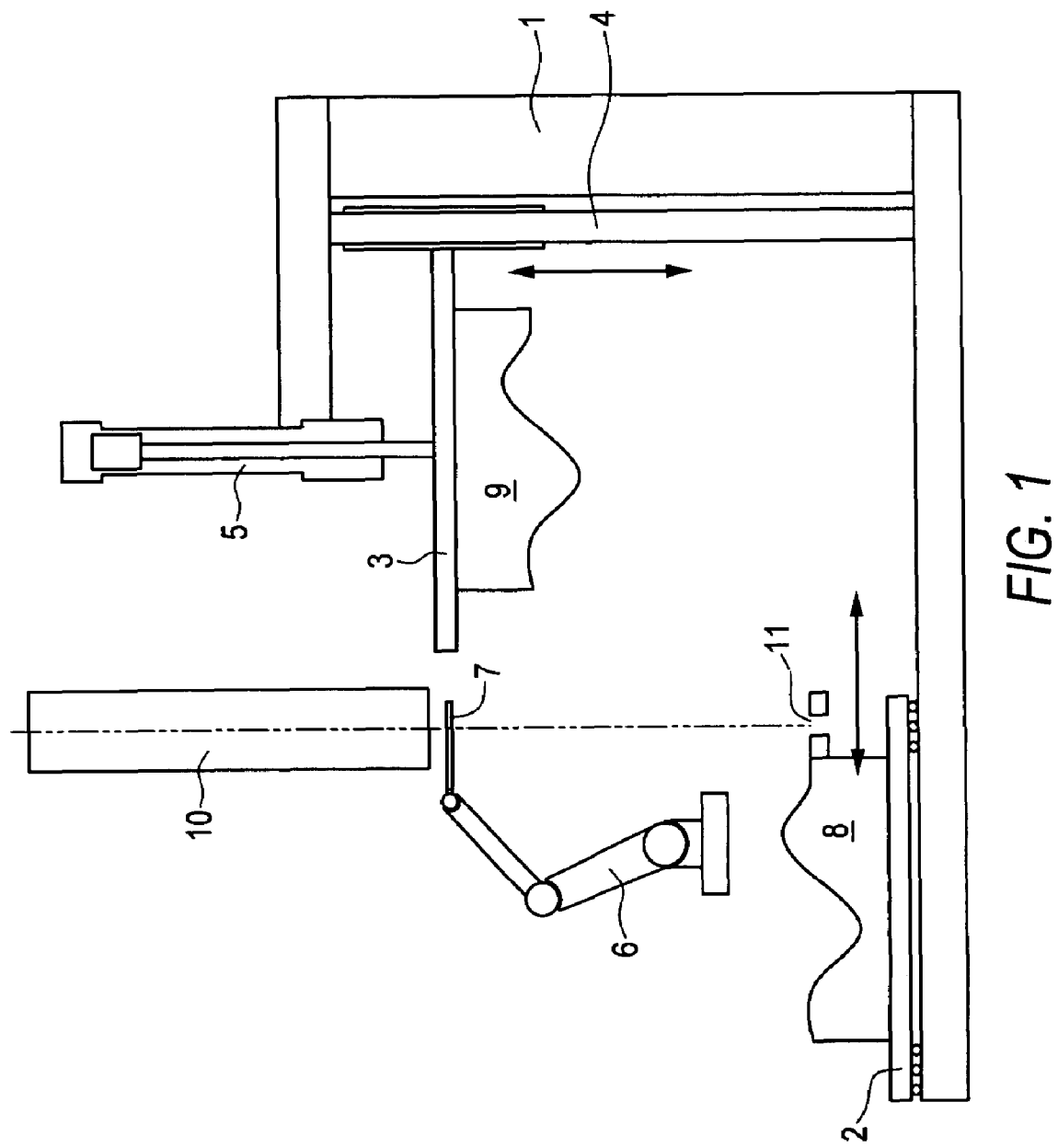
FIG. 1 is a schematic side view of the main components of a blow molding machine for performing the so-called tube-insertion method.
Figure 2:
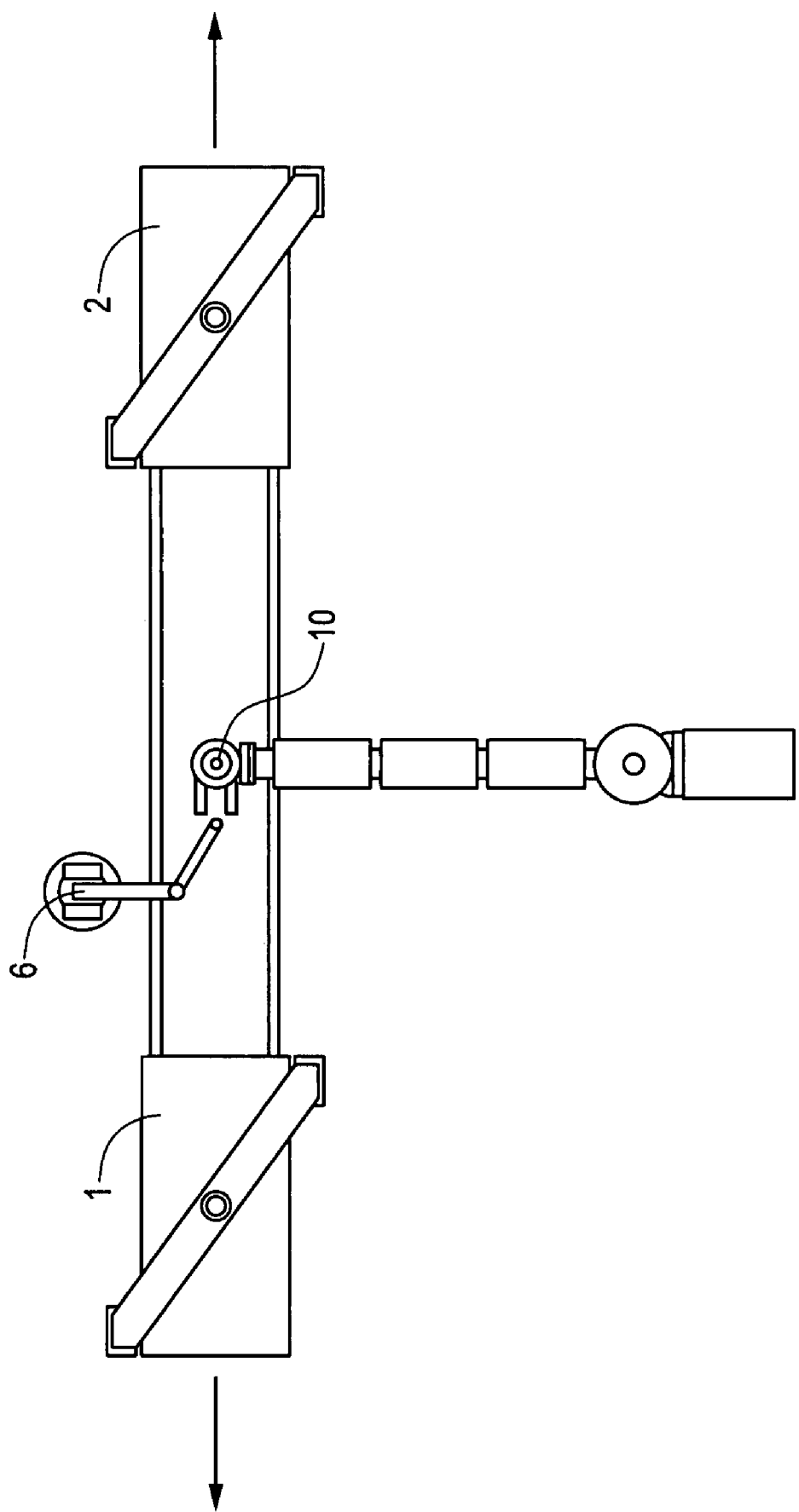
FIG. 2 is a purely schematic top view on an embodiment comprising two closing units.

The following production process takes place in the embodiment of the invention according to FIG. 3: The basic position is the same as described with reference to FIG. 1 (upper mold half 9 is moved upwards, lower mold half 8 moved thereunder, tongs 7 of the insertion device 8 are opened under head 10, parison is extruded). On the "guide path 14 insertion movement", a carriage is provided in a position under the head 10, which carriage has been connected via a coupling means to the lower closing plate 2 through the previously performed lateral movement of the two closing units 12. The carriage pulls out the lower closing plate 2 with the lower mold half 8 to such an extent that the receiving tool 11 described in FIG. 1 comes to rest vertically under head 10. When the parison has reached the preset length, it is separated by the tongs 7 of the insertion device 6 and moved with its lower end to the receiving tool 11. During insertion the carriage pushes the lower closing plate 2 and tool half 8 up to a position situated vertically under the upper closing plate 3, the mold 12 is closed, the tongs 7 of the insertion device 6 move under the head 10, and the two closing units 12 travel on the "guide path 13 closing units" to the other side. In so doing the one lower closing plate 2 is first decoupled from the carriage. When the travel is completed, the other closing plate 2 is connected to the carriage. The closing unit 12 is opened and the article is removed. The second closing unit is now in the basic position and the cycle takes place exactly in the way as has been described above.

What is claimed is:

1. A blow molding machine comprising an extruder having an extrusion head, comprising at least one, preferably two, closing units, each having an upper closing plate with the upper mold half and a lower closing plate with the lower mold half, the upper closing plates with the upper mold halves being vertically movable and the lower closing plates with the lower mold halves being horizontally movable to an insertion device under the extrusion head, the insertion device inserting the respective parison exiting from the extrusion head into the lower mold half positioned at said place, wherein the two closing units can be reciprocated along a first guide path extending in a direction transverse to a second guide path that extends from a central removal position the first guide path to the insertion device, the lower dosing plates with the lower mold halves of the two closing units being alternately movable along the second guide path from the removal position to the insertion device and back.

2. The blow molding machine according to claim 1 wherein the first guide path is connected in the area of the central removal station to the second guide path, that the removal station and the second guide path are in alignment with one another, and that a respective blowing station is arranged at both sides of the removal station.

3. The blow molding machine according to claim 1, wherein the two closing units are jointly movable such that one closing unit can be positioned at the removal station and the other closing unit at the blowing station thereof.

4. The blow molding machine according to claim 1, wherein the second guide path has arranged thereon a carriage which is connectable via a coupling means to the lower closing plate of the respective closing unit arranged at the removal station.

5. The blow molding machine according to claim 1, wherein a receiving tool for the parison is respectively arranged at the rear end of the two lower mold halves.

6. The blow molding machine according to claim 5, wherein the receiving tool is a pin or a pair of tongs that is pivotable by about 90°.

7. The blow molding machine according to claim 1, wherein the insertion device is an industrial robot provided with tongs.

8. A method for blow molding tubular bodies of plastics which are preferably bent several times, using one closing unit, comprising the following steps:

a) the lower closing plate with the lower mold half of a closing unit is moved in the opened state thereof from a removal position along a first guide path under the extrusion head;

b) an extruded parison is inserted into the lower mold half while the lower closing plate with the lower mold half is moved back under the upper closing plate with the upper mold half to the removal position;

c) the closing unit is closed;

d) the parison in the closing unit is moved to its blowing station on a second guide path which extends in a direction transverse to the first guide path and blown at the associated blowing station into the tubular body;

e) the closing unit is opened and the tubular body is removed.

9. A method for blow molding tubular bodies of plastics which are preferably bent several times, using two closing units, comprising the following steps:

a) the lower closing plate with the lower mold half of a first closing unit is moved in the opened state thereof from a removal position along a guide path under the extrusion head;

b) an extruded parison is inserted into the lower mold half;

c) the lower closing plate with the lower mold half is moved back under the upper closing plate with the upper mold half to the removal position;

d) the first closing unit is closed;

e) the first closing unit is moved to its blowing station on a second guide path which extends in a direction transverse to the first guide path and is connected to said first guide path, while preferably at the same time the second closing unit is moved out of its blowing station to the removal station;

f) while the lower closing plate with the lower mold half of the second closing unit is moved under the extrusion head and the next extruded parison is inserted into the lower mold half and the lower closing plate is moved back to the removal position, the parison in the first closing unit is blown at the first blowing station into the tubular body;

g) the second closing unit is moved to the second blowing station while the first closing unit is moved to the removal station preferably at the same time;

h) the first closing unit is opened and the tubular body is removed.

\* \* \* \* \*